United States Patent
Morita (10) Patent No.: US 10,889,597 B2
(45) Date of Patent: Jan. 12, 2021

(54) DESULFURIZER, HYDROGEN GENERATION DEVICE, AND FUEL CELL SYSTEM

(71) Applicant: Panasonic Intellectual Property Management Co., Ltd., Osaka (JP)

(72) Inventor: Masashi Morita, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/228,765

(22) Filed: Dec. 21, 2018

(65) Prior Publication Data
US 2019/0300548 A1    Oct. 3, 2019

(30) Foreign Application Priority Data
Mar. 30, 2018    (JP) .................. 2018-067962

(51) Int. Cl.
*C07F 1/00*    (2006.01)
*B01J 20/34*    (2006.01)
(Continued)

(52) U.S. Cl.
CPC .............. *C07F 1/005* (2013.01); *B01D 53/02* (2013.01); *B01J 20/226* (2013.01); *B01J 20/345* (2013.01); *B01J 31/1691* (2013.01); *C01B 3/38* (2013.01); *H01M 8/0618* (2013.01); *H01M 8/0675* (2013.01); *H01M 8/22* (2013.01); *B01D 2253/204* (2013.01); *B01D 2255/20761* (2013.01); *B01D 2256/24* (2013.01); *B01D 2257/306* (2013.01); *B01D 2259/40096* (2013.01); *C01B 2203/0233* (2013.01); *C01B 2203/0283* (2013.01); *C01B 2203/044* (2013.01); *C01B 2203/047* (2013.01);
(Continued)

(58) Field of Classification Search
None
See application file for complete search history.

(56) References Cited

U.S. PATENT DOCUMENTS

2012/0152845 A1* 6/2012 LeVan .................. B01J 20/3236
                                                                         210/660

FOREIGN PATENT DOCUMENTS

| EP | 599351 | 6/1994 |
| JP | 6-256779 | 9/1994 |
| WO | 2017/150019 | 9/2017 |

OTHER PUBLICATIONS

Shigeo Satokawa et al., "Adsorptive removal of dimethylsulfide and t-butylmercaptan from pipeline natural gas fuel on Ag zeolites under ambient conditions", Applied Catalysis B : Environmental 56 (2005), Jan. 22, 2005, pp. 51-56.
(Continued)

*Primary Examiner* — Clinton A Brooks
(74) *Attorney, Agent, or Firm* — McDermott Will & Emery LLP (57) ABSTRACT

Provided is a desulfurizer for removing a sulfur compound contained in a fluid, comprising a desulfurization agent for removing the sulfur compound from the fluid and a housing which contains the desulfurization agent and the inside of which the fluid flows through. The desulfurization agent includes a metal organic framework. The metal organic framework has copper ions and organic ligands. The organic ligands include 1,3,5-benzenetricarboxylic acid and 1,3-benzenedicarboxylic acid.

11 Claims, 9 Drawing Sheets

(51) Int. Cl.
*H01M 8/06* (2016.01)
*B01J 31/16* (2006.01)
*H01M 8/0662* (2016.01)
*H01M 8/22* (2006.01)
*H01M 8/0612* (2016.01)
*B01J 20/22* (2006.01)
*C01B 3/38* (2006.01)
*B01D 53/02* (2006.01)

(52) U.S. Cl.
CPC .................. *C01B 2203/066* (2013.01); *C01B 2203/1241* (2013.01); *C01B 2203/1247* (2013.01); *C01B 2203/1258* (2013.01)

(56) References Cited

OTHER PUBLICATIONS

Wenhua Zhang et al., "Impact of Synthesis Parameters on the Formation of Defects in HKUST-1", European Journal of Inorganic Chemistry, Nov. 29, 2016, pp. 925-931.

* cited by examiner

DESULFURIZER, HYDROGEN GENERATION DEVICE, AND FUEL CELL SYSTEM

BACKGROUND

1. Technical Field

The present invention relates to a desulfurizer capable of removing a sulfur compound contained in a fluid. The present invention further relates to a hydrogen generation device comprising the desulfurizer and a fuel cell system comprising the hydrogen generation device.

2. Description of the Related Art

As a distributed energy system in which energy can be utilized effectively, a fuel cell cogeneration system having high electric power generation efficiency and total efficiency has attracted attention. Hereinafter, in the present specification, the term "fuel cell cogeneration system" is referred to as "fuel cell system". In many fuel cell systems, hydrogen is used as a fuel for electric power generation. However, since a means for supplying hydrogen required for electric power generation in the fuel cell system is not prepared as an infrastructure, hydrogen is required to be generated in the fuel cell system. Hence, the fuel cell system comprises not only a fuel cell but also a hydrogen generation device.

In the hydrogen generation device, hydrogen is generated from hydrocarbon fuel such as a natural gas or a liquefied petroleum gas (hereinafter, referred to as "LPG"), for example, by a hydrogen generation method such as a steam reforming reaction method. The natural gas contains not only a sulfur compound derived from a fuel but also tertiary-butyl mercaptan (hereinafter, referred to as "TBM"), dimethylsulfide (hereinafter, referred to as "DMS"), or tetrahydrothiophene (hereinafter, referred to as "THT") as an odorant at a concentration of several ppm.

In light of preventing a steam reforming catalyst from being poisoned with sulfur, a desulfurizer is provided anteriorly to the steam reforming catalyst. An example of a desulfurization method in the desulfurizer is an adsorptive desulfurization method or a hydrodesulfurization method.

In the adsorptive desulfurization, the sulfur compound is adsorbed on a zeolite including a transition metal such as Ag, Cu, or Mn at ordinary temperature. In this way, the sulfur compound is removed. A desulfurizer is exchanged periodically. DMS is an odorant which is hardly adsorbed; however, an Ag zeolite is proposed as a material capable of removing DMS efficiently without being affected by gas dew point.

In the hydrodesulfurization method, while the desulfurizer is heated to 200-350 degrees Celsius, a part of a reformed gas exhausted from the hydrogen generation device flows back to the desulfurizer for recycle. In the desulfurizer, hydrogen contained in the reformed gas is adsorbed on a CoMo catalyst. The sulfur compound is hydrolyzed with the adsorbed hydrogen to generate hydrogen sulfide. The generated hydrogen sulfide is removed with zinc oxide. Patent Literature 1 discloses, as a hydrodesulfurization method, a method for adsorbing and removing sulfur with a CuZnO desulfurization agent concurrently with hydrolyzing the sulfur compound with hydrogen at a temperature of 200-350 degrees Celsius.

Patent Literature 2 discloses a method for removing a sulfur compound with a metal organic framework (hereinafter, referred to as "MOF") composed of Cu ions and 1,3,5-benzenetricarboxylic acid (hereinafter, referred to as "BTC"). The metal organic framework disclosed in Patent Literature 2 is referred to as HKUST-1. In other words, the MOF (namely, HKUST-1) disclosed in Patent Literature 2 is capable of desulfurizing DMS specifically at ordinary temperature.

Non-Patent Literature 1 discloses using isophthalic acid to incorporate defect in HKUST-1.

CITATION LIST

Patent Literature

Patent Literature 1: European Patent Application Publication No. 0 599 351 A1
Patent Literature 2: WO 2017/150019 A1

Non-Patent Literature

Non-Patent Literature 1: W. Zhang et. Al. "Impact of Synthesis Parameters on the Formation of Defects in HKUST-1", European Journal of Inorganic Chemistry (2017) p. 925-931

SUMMARY

An object of the present invention is to provide a novel desulfurizer in which three-dimensional structure of HKUST-1 is maintained to achieve high desulfurization performance.

The present invention provides a desulfurizer for removing a sulfur compound contained in a fluid, comprising:
a desulfurization agent for removing the sulfur compound from the fluid; and
a housing which contains the desulfurization agent and the inside of which the fluid flows through,
wherein
the desulfurization agent includes a metal organic framework;
the metal organic framework has copper ions and organic ligands; and
the organic ligands include 1,3,5-benzenetricarboxylic acid and 1,3-benzenedicarboxylic acid.

The present invention provides a novel desulfurizer in which three-dimensional structure of HKUST-1 is maintained to achieve high desulfurization performance. The present invention further provides a hydrogen generation device comprising the desulfurizer and a fuel cell system comprising the hydrogen generation device.

DETAILED DESCRIPTION OF THE EMBODIMENT (Findings which Established the Foundation of the Present Invention)

The present inventor considered a problem of a conventional desulfurization method and agent. As a result, the present inventor found the following matters.

First, the present inventor found a problem that the conventional adsorptive desulfurization method involves cost since an expensive desulfurization agent containing Ag (e.g., Ag zeolite) is used. In addition, in the conventional hydrodesulfurization method, a recycle flow path for guiding a part of the reformed gas generated in the hydrogen generation device into a desulfurizer is required to be provided between the hydrogen generation device and the desulfurizer. For this reason, the present inventor found that a problem that the hydrogen generation device has a complicated structure and that the conventional hydrodesulfurization method involves cost.

In a case of using HKUST-1 as a desulfurization agent, the present inventor found that a problem that cost is involved since BTC included in HKUST-1 is expensive. In other words, the price of BTC is approximately nine times as much as that of 1,3-benzenedicarboxylic acid (i.e., isophthalic acid) or 1,4-benzenedicarboxylic acid (i.e., terephthalic acid).

The present inventor found that a part of BTC included in MOF is substituted with an inexpensive another organic ligand to maintain high desulfurization performance and to reduce cost. In particular, the present inventor found that the part of BTC, which is expensive organic ligand, is substituted with, for example, isophthalic acid or terephthalic acid, both of which are inexpensive, to reduce cost.

Hereinafter, the embodiment of the present disclosure will be described with reference to the drawings.

Description of Abbreviations and Terms

The following Table 1 shows meanings of abbreviations and terms used in the present specification.

TABLE 1

| Abbreviations and Terms | Meanings |
| --- | --- |
| BTC | 1,3,5-Benzenetricarboxylic acid |
| DMF | N,N-dimethylformamide |
| DMS | Dimethyl sulfide |
| HKUST-1 | Metal organic framework disclosed in Patent Literature 2 |
| Isophthalic acid | 1,3-Benzenedicarboxylic acid |
| LPG | Liquefied petroleum gas |
| MOF | Metal organic framework |
| PCP | Porous coordination polymer (i.e., Metal organic framework) |

TABLE 1-continued

| Abbreviations and Terms | Meanings |
| --- | --- |
| SEM | Scanning electron microscope |
| TBM | Tertiary-butyl mercaptan |
| TEM | Transmission electron microscope |
| Terephthalic acid | 1,4-Benzenedicarboxylic acid |
| THT | Tetrahydrothiophene |

EMBODIMENT (Detail of Desulfurizer)

Figure 1:
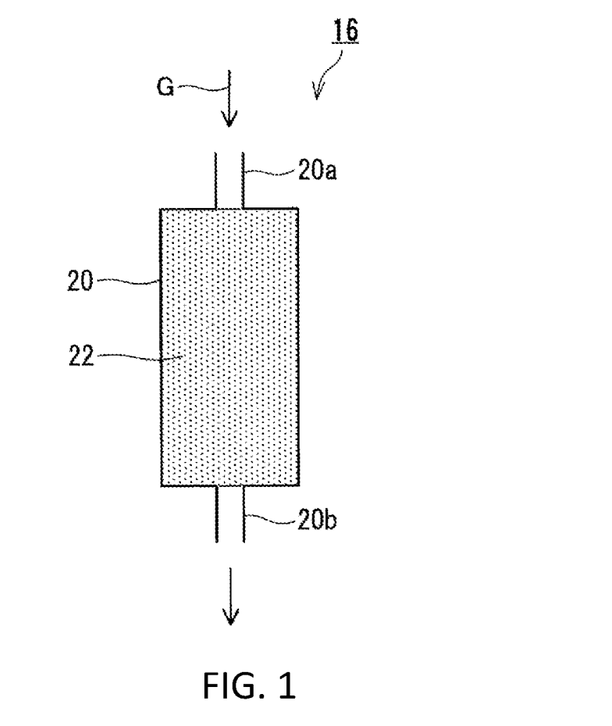
FIG. 1 shows a schematic view of a desulfurizer according to the embodiment.

First, with reference to FIG. 1, the configuration of a desulfurizer 16 according to the embodiment of the present invention will be described. FIG. 1 shows a schematic view of the desulfurizer 16 according to the embodiment. As shown in FIG. 1, in the desulfurizer 16, a sulfur compound contained in a fuel gas G is removed. The desulfurizer 16 comprises a housing 20 having an inlet 20a and an outlet 20b. The housing 20 contains a desulfurization agent 22.

The desulfurization agent 22 includes a MOF formed of copper ions and organic ligands. The desulfurization agent 22 may be formed only of the MOF or may contain not only the MOF but also an additive component such as activated carbon. The MOF may be supported by a support formed of a material of a ceramics, glass, carbon, or a metal. As will be described later in more detail, the MOF has the copper ions and the organic ligands. The organic ligands include 1,3,5-benzenetricarboxylic acid and 1,3-benzenedicarboxylic acid. In the MOF included in the desulfurization agent 22, a part of 1,3,5-benzenetricarboxylic acid included in HKUST-1 is substituted with 1,3-benzenedicarboxylic acid.

The MOF contained in the desulfurization agent 22 may be powdery. It is desirable that the powdery MOF has a BET specific surface area of not less than 500 m$^2$/gram. The upper limit of the BET specific surface area of the powdery MOF is not limited; however, for example, it may be 7,000 m$^2$/gram. The mean particle size of the primary particle of the MOF is not limited; however, for example, it may be not less than 2 micrometers and not more than 30 micrometers.

The mean particle size can be calculated by, for example, the following method. First, the powdery MOF is observed with an electron microscope (e.g., scanning electron microscope, which is referred to as "SEM", or transmission electron microscope, which is referred to as "TEM") to provide a SEM or TEM image. In the provided SEM or TEM image, a mean surface area of a plurality of MOF particles (e.g., 50 MOF particles) is calculated by an image processing technique. A diameter of a circle having an area equal to the calculated mean surface area is deemed to be a mean particle size of the MOF particle.

Since the MOF has a uniform skeleton structure in which molecules which constitute the three-dimensional skeleton of the MOF are arranged regularly, the MOF has a high specific surface area. The MOF is referred to as a porous coordination polymer (hereinafter, referred to as "PCP"). An organic site (i.e., organic ligand) or an inorganic site (i.e., metal ion) of the MOF having a uniform skeleton structure can be selected or combined appropriately to control a physical or chemical property (e.g., pore size, pore structure, or surface function) accurately. Therefore, compared to the conventional desulfurization agent such as a zeolite, the MOF has significantly high design flexibility.

Desulfurization performance of the MOF which is used as the desulfurization agent 22 depends on a kind of the metal ion. The MOF which is used as the desulfurization agent 22 according to the embodiment contains the copper ions as the metal ions. Unlike the hydrodesulfurization method in which hydrogen is supplied to a desulfurizer, the MOF including the copper ions and the organic ligands does not require hydrogen and desulfurizes at ordinary pressure. In other words, without hydrogen, the MOF removes the sulfur compound contained in the fluid. Since copper is more inexpensive than a precious metal such as silver, cost is reduced.

Figure 2:
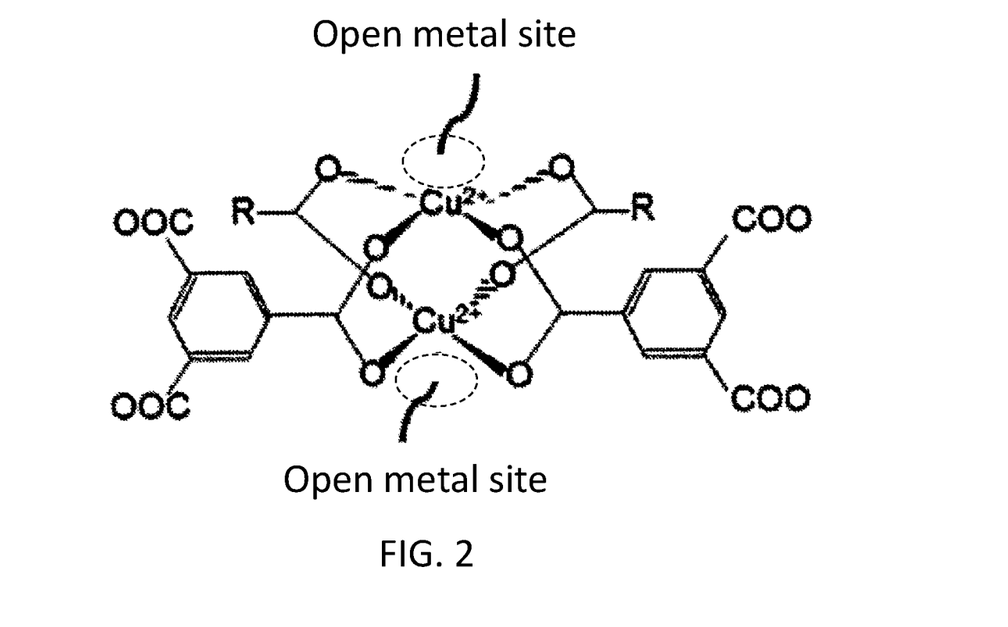
FIG. 2 shows a schematic view of a metal organic framework having an open metal site.

It is desirable that the MOF has an open metal site, since the sulfur compound is adsorbed easily to the open metal site. FIG. 2 shows a schematic view of the MOF having the open metal site. As shown in FIG. 2, in the MOF having the open metal site, the metal ion (namely, the Cu cation) has an unsaturated ligand. A cupper cation is of six-coordination due to Jahn-Teller effect, although the cupper cation having six ligands is unstable. In other words, the metal ion (namely, the Cu cation) has one or more vacant ligands (i.e., one or more vacant sites). In FIG. 2, the cupper cation has two open metal sites.

The sulfur compound is adsorbed to the vacant site due to interaction with the metal ion. Another MOF having the open metal site has a metal ion having saturated ligands; however, has adsorption activity generated due to torsion or deformation between the ligands. The adsorption activity functions as the open metal site. Since the open metal site having the unsaturated ligand has higher activity than the open metal site generated due to the torsion or the deformation between the ligands, it is desirable that the MOF which is used as the desulfurization agent 22 has the open metal site having the unsaturated ligand. In other words, it is desirable that the metal ion (i.e., copper cation) has one or more vacant ligands (i.e., one or more vacant sites) in the MOF which is used as the desulfurization agent 22.

The sulfur compound contained in the fluid is adsorbed to the MOF contained in the desulfurization agent 22. In this way, the fluid is desulfurized. It is desirable that the pore on the surface of the MOF is not shielded or covered by other materials such as another desulfurizer. In case where pore of the MOF is shielded or covered by other materials, the sulfur compound having a relatively large volume (e.g., TBM) is prevented from being adsorbed to the MOF. As a result, the desulfurization performance may be lowered.

Many MOFs can be synthesized by a known solvothermal method (i.e., hydrothermal synthesis method). For example, a copper ion source and organic ligands are added to a solvent such as dimetheylformamide, ethanol, or water to prepare a solution of a starting material. Then, the solution of the starting material is gently heated under a basic condition to grow a MOF crystal. An example of the copper ion source is copper nitrate hydrate. A product containing the synthesized MOF is washed with a washing liquid. The residual starting material is removed from the product. The washing liquid is the same liquid as the solvent used for the synthesis of the MOF. After the washing, the powdery MOF is provided through solid-liquid separation and drying.

As shown in FIG. 1, the desulfurization agent 22 containing the thus-provided MOF is put in the inside of the housing 20 of the desulfurizer 16. Then, a pipe is provided to connect between the supply source of the fuel gas G (see FIG. 3, which will be described later) and the desulfurizer 16. The fuel gas G is supplied from the supply source of the fuel gas G to the desulfurizer 16. The supplied fuel gas G flows through the housing 20, while the supplied fuel gas G is being brought into contact with the desulfurization agent 22 in the housing 20. The fuel gas G flows through the inside of the housing 20 to remove the sulfur compound from the fuel gas G by the desulfurization agent 22.

An example of the fuel gas G is hydrocarbon fuel such as city gas, natural gas, ethane, propane, or LPG. The sulfur compound has been added to the hydrocarbon fuel. In other words, the hydrocarbon fuel contains the sulfur compound. An example of the sulfur compound contained in the fuel gas G is DMS.

It is unnecessary to heat or cool the supplied fuel gas G intentionally in the desulfurizer 16. The temperature of the fuel gas G is the substantially same as ordinary temperature. For example, the fuel gas G has temperature of not less than minus 15 degrees Celsius and not more than 60 degrees Celsius. It is also unnecessary to heat the desulfurization agent 22 contained in the desulfurizer 16 intentionally. The temperature of the desulfurization agent 22 is the substantially same as ordinary temperature. For example, the desulfurization agent 22 has temperature of not less than 45 degrees Celsius and not more than 60 degrees Celsius. It is desirable that the desulfurization agent 22 is used at temperature of not more than 100 degrees Celsius. In a case where the desulfurization agent 22 has temperature of more than 100 degrees Celsius, desorption of the sulfur compound is dominantly generated. In a case where the desulfurization agent 22 has temperature of not less than 300 degrees Celsius, the organic ligand is oxidized to decompose. As a result, the MOF fails to have desulfurization performance.

Therefore, the temperature of the desulfurization agent 22 (i.e., the temperature of the MOF contained in the desulfurization agent 22) is maintained at not more than 100 degrees Celsius to prevent the sulfur compound from being desorbed from the MOF contained in the desulfurization agent 22. Furthermore, the organic ligand is prevented from being oxidized. The housing 20 containing the desulfurization agent 22 may be cooled to maintain the temperature of the desulfurization agent 22 at not more than 100 degrees Celsius. In other words, the housing 20 may comprises a cooler for cooling the inside thereof.

In the desulfurizer 16, the pressure of the fuel gas G at the inlet 20a may be lower than the pressure of the fuel gas G at the supply source. In other words, the fuel gas G is supplied to the desulfurizer 16 without applying pressure thereto in the pipe from the supply source to the desulfurizer 16. The difference of the pressure between the fuel gas G at the inlet 20a of the desulfurizer 16 and the standard pressure is, for example, not less than 2 kPa and not more than 5 kPa.

As above described, since the fluid is desulfurized at ordinary pressure in the desulfurizer 16 according to the embodiment, it is unnecessary to provide a pressure riser in the pipe from the supply source of the fuel gas G to the desulfurizer 16. Therefore, the configuration of the desulfurizer 16 according to the embodiment is simplified. Furthermore, energy required to apply pressure can be saved.

In addition, in the desulfurizer 16 according to the embodiment, the sulfur compound adsorbed to the MOF contained in the desulfurization agent 22 is desorbed to reproduce the desulfurization agent 22. In this case, the desulfurizer 16 according to the embodiment further comprises a heater to heat the MOF to temperature of more than 100 degrees Celsius.

In particular, after the supply of the fuel gas G to the desulfurizer 16 is stopped, an inert gas such as nitrogen or a rare gas is supplied to the inside of the desulfurizer 16 to purge the fuel gas G accumulated in the desulfurizer 16. Then, the desulfurizer 16 is heated with the heater. The temperature of the inside of the desulfurizer 16 (namely, the temperature of the MOF contained in the desulfurization agent 22) is, for example, more than 100 degrees Celsius. Desirably, the temperature is 150 degrees Celsius. In light of the function of the desulfurization agent 22, the upper limit of the heating temperature is, for example, 200 degrees Celsius.

The desulfurizer 16 is heated to desorb the sulfur compound from the desulfurization agent 22. The inert gas is supplied to the desulfurizer 16 concurrently with heating of the desulfurizer 16 to exhaust the sulfur compound desorbed from the desulfurization agent 22 to the outside. In this way, the desulfurization agent 22 is reproduced in the desulfurizer 16 to recover the adsorption performance. As a result, substantial adsorption volume of the desulfurizer 16 is increased.

Patent Literature 2 discloses desulfurizing a fluid containing DMS specifically at ordinary temperature with the MOF formed of Cu ions and BTCs (namely, HKUST-1). However, the present inventor is afraid that there is a limit in the cost reduction of BTC, even after taking into consideration the widespread use of MOF in the future.

The present inventor focused on the isophthalic acid, which is inexpensive than BTC, to establish both the maintenance of the three-dimensional skeleton of HKUST-1 and the cost reduction. The present inventor substituted a part of the organic ligands (i.e., BTC) included in HKUST-1 with isophthalic acid, which is inexpensive than BTC, to provide HKUST-1 in which isophthalic acid has been incorporated. Hereinafter, in the present specification, HKUST-1 in which isophthalic acid has been incorporated is referred to as "isophthalic-acid-HKUST-1". In HKUST-1 in which isophthalic acid has been incorporated, a part of the organic ligands (i.e., BTC) included in HKUST-1 is substituted with isophthalic acid.

It is desirable that a molar ratio of isophthalic acid to the sum of BTC and isophthalic acid included in the isophthalic-acid-HKUST-1 is not less than 10% and not more than 25%. According to Table 1 in Non-Patent Literature 1, if the molar ratio is more than 25%, the specific surface area of the isophthalic-acid-HKUST-1 is lowered. Usually, MOF has a lot of micropores. The micropore means a pore having a diameter of less than 2 nanometers. However, if the molar ratio is more than 25%, the possibility that two or more isophthalic acid molecules are close to each other is increased. As a result, the number of mesopores included in the MOF is increased. The mesopore means a pore having a diameter of not less than 2 nanometers and not more than 50 nanometers. The increase in the mesopores lowers the specific surface area of MOF.

According to Table 1 in Non-Patent Literature 1, if the molar ratio is not less than 12%, the isophthalic-acid-HKUST-1 has a sufficiently large specific surface area of not less than approximately 1,800 $m^2$/gram. Therefore, if the molar ratio is not less than 12% and not more than 25%, the desulfurizer 16 has high desulfurization performance.

(Detail of Fuel Cell System)

Figure 3:
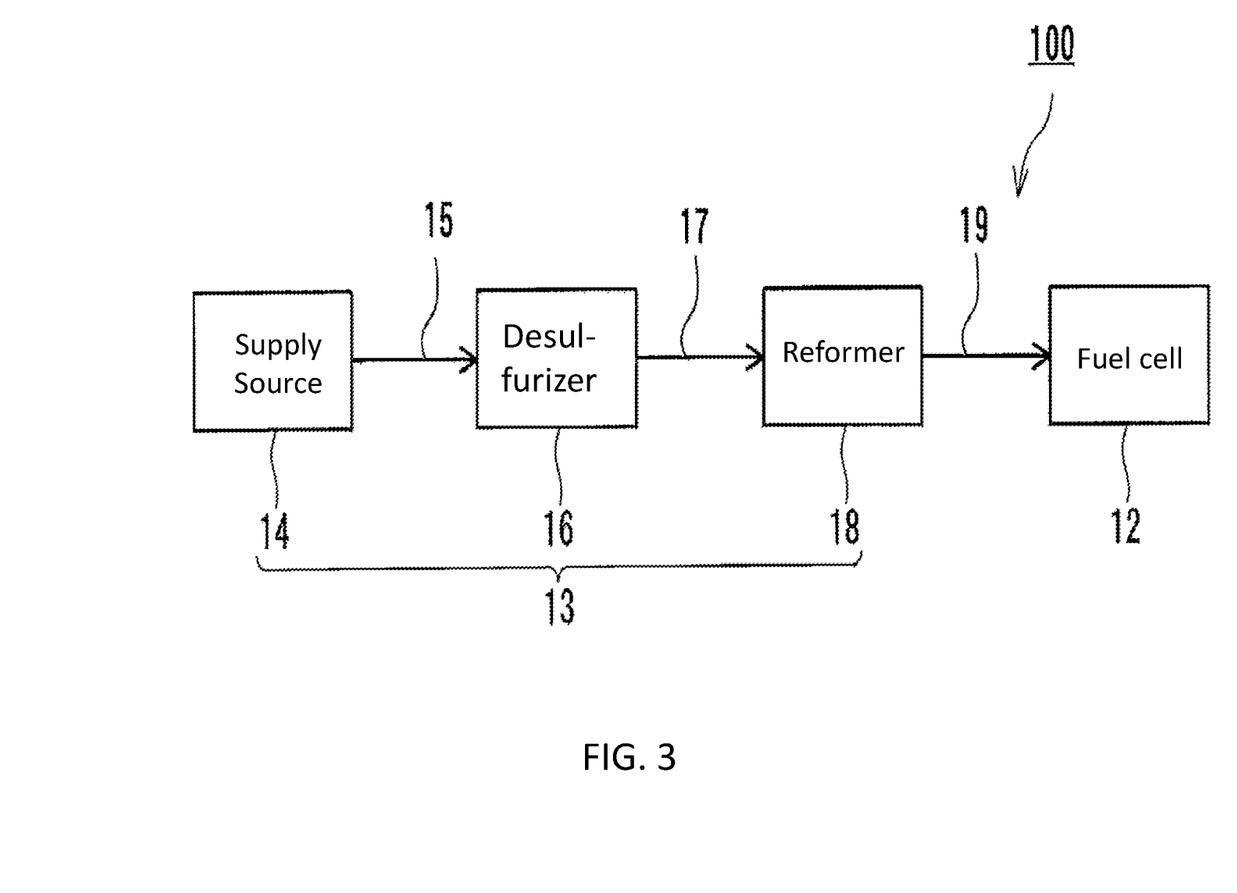
FIG. 3 shows a block diagram of a fuel cell system according to the embodiment.

Hereinafter, a fuel cell system 100 comprising the desulfurizer 16 according to the embodiment will be described with reference to FIG. 3. FIG. 3 shows a block diagram showing the fuel cell system 100 according to the embodiment.

As shown in FIG. 3, the fuel cell system 100 comprises a fuel cell 12 and a hydrogen generation device 13. The hydrogen generation device 13 comprises a supply source 14, the desulfurizer 16, and a reformer 18.

The supply source 14 supplies the fuel gas G containing the sulfur compound other than hydrogen sulfide as an odorant. An example of the supply source 14 is a storage tank or an infrastructure of the fuel gas G.

The desulfurizer 16 is connected to the supply source 14 through a first flow channel 15 through which the fuel gas G flows. In this way, the fuel gas G is supplied from the supply source 14 to the desulfurizer 16. The fuel gas G desulfurized in the desulfurizer 16 is supplied to the reformer 18.

In the reformer 18, hydrogen is generated, for example, by a steam reforming reaction. The reformer 18 contains a steam reforming catalyst for promoting the steam reforming reaction. The reformer 18 is connected to the desulfurizer 16 through a second flow channel 17 such as a pipe. The fuel gas G desulfurized in the desulfurizer 16 is supplied to the reformer 18. In the reformer 18, a hydrogen-containing gas is generated by a steam reforming reaction from the fuel gas G.

The hydrogen generation device 13 is connected to the fuel cell 12 through a third flow channel 19 such as a pipe. The hydrogen-containing gas generated in the hydrogen generation device 13 is supplied to the fuel cell 12 through the third flow channel 19. A device (not shown) for removing carbon monoxide may be provided between the fuel cell 12 and the hydrogen generation device 13. An example of the device for removing carbon monoxide is a carbon monoxide transformer or a carbon monoxide remover.

The hydrogen-containing gas generated in the hydrogen generation device 13 is supplied to a fuel electrode of the fuel cell 12. Air (i.e., an oxidant gas) is supplied from an air-supplying device (not shown) to an air electrode of the fuel cell 12. In the fuel cell 12, electric power is generated by an electrochemical reaction using the supplied hydrogen and air.

Note that the fuel gas G which is supplied to the fuel cell system 100 is, typically, hydrocarbon fuel. The sulfur compound is removed from the hydrocarbon fuel in the desulfurizer 16 to use the hydrocarbon fuel for various purposes. An example of the fuel gas G which is supplied to the fuel cell system 100 is city gas, natural gas, ethane, propane, or liquified petroleum gas (LPG). As above described, a small amount of the odorant is added to the fuel gas for a gas leakage prevention measure. An example of the component of the odorant is a sulfur compound such as TBM, DMS, THT. The concentration of the odorant in the fuel gas G is several parts per million (ppm) at ordinary temperature (i.e., 5-35 degrees Celsius). The sulfur compound (i.e., odorant) is removed from the fuel gas G with the desulfurizer 16 included in the hydrogen generation device 13. In this way, the steam reforming catalyst is prevented from being poisoned in the reformer 18.

In addition, unlike the fuel cell system comprising a hydrodesulfurization device, it is unnecessary to supply hydrogen to the desulfurizer 16 in the fuel cell system 100 according to the present embodiment. Therefore, the configuration of the fuel cell system 100 according to the embodiment is simplified, compared to the fuel cell system in which the hydrodesulfurization method is used.

(Variation of Hydrogen Generation Device 13)

Figure 4:
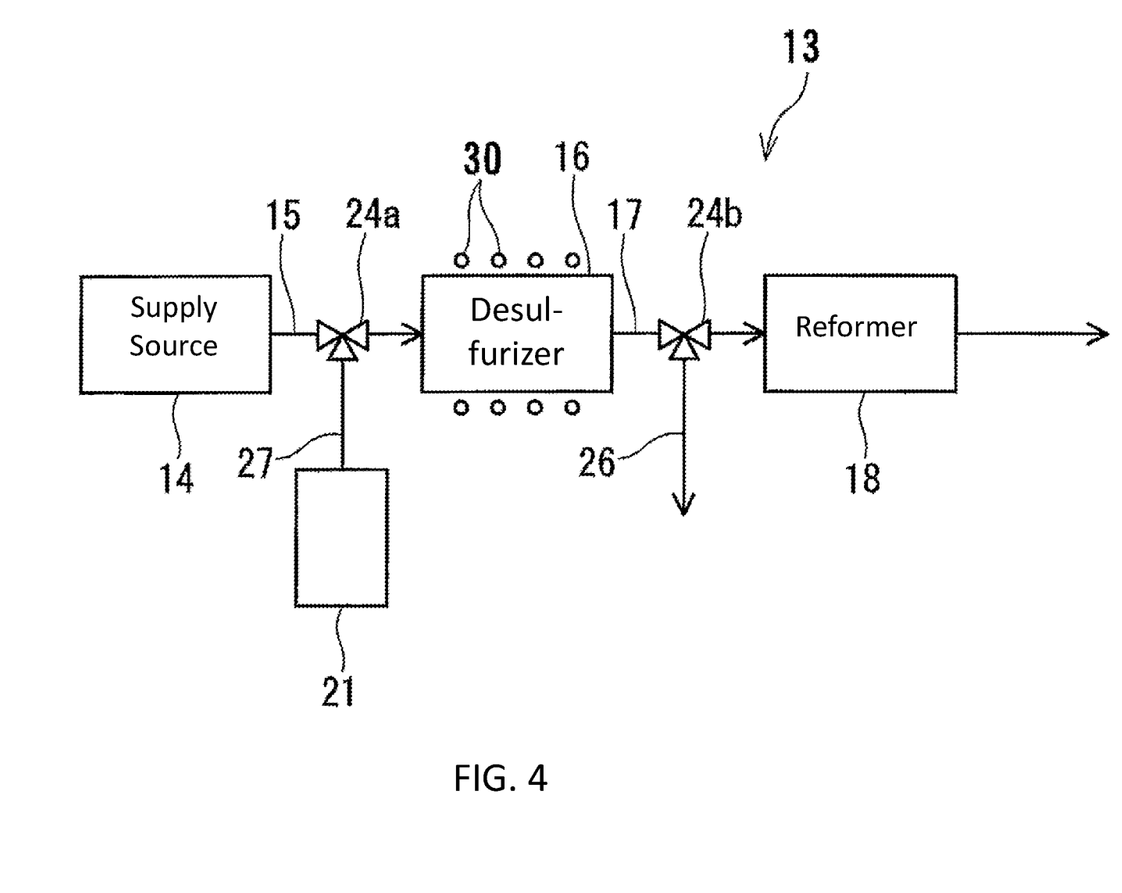
FIG. 4 shows a block diagram of a hydrogen generation device in a fuel cell system according to the first variation of the embodiment.
Figure 5:
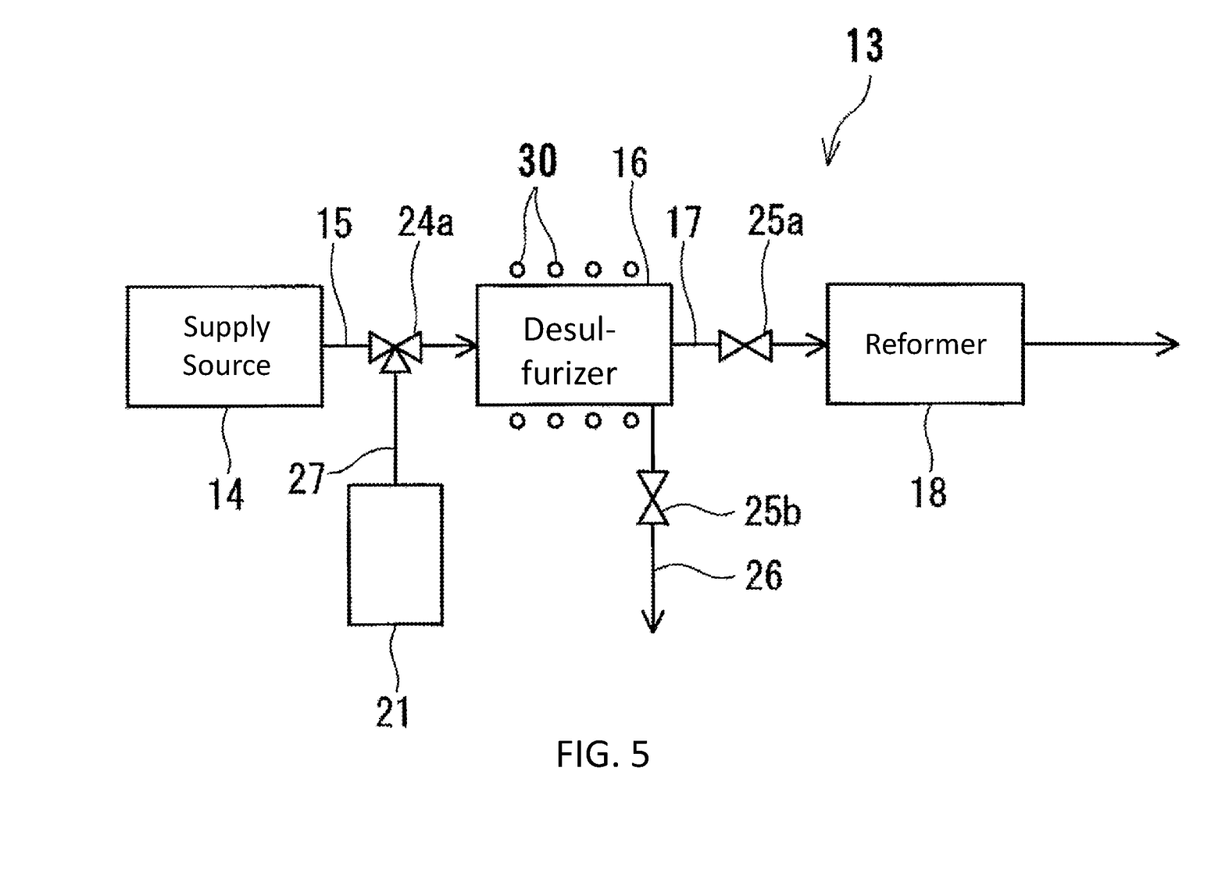
FIG. 5 shows a block diagram of a hydrogen generation device in a fuel cell system according to the second variation of the embodiment.

Hereinafter, with reference to FIG. 4 and FIG. 5, variations of the hydrogen generation device 13 will be described. FIG. 4 shows a block diagram of the hydrogen generation device 13 according to the first variation. FIG. 5 shows a block diagram of the hydrogen generation device 13 according to the second variation.

First, the hydrogen generation device 13 according to the first variation will be described. The hydrogen generation device 13 according to the first variation is the same as the hydrogen generation device 13 shown in FIG. 3, except that the hydrogen generation device 13 further comprises a carrier gas supply source 21, a heater 30, a carrier gas supply channel 27, a three-way valve 24a, a three-way valve 24b and a sulfur-containing gas exhaust channel 26. The three-way valve 24a is disposed in the first flow channel 15. The three-way valve 24b is disposed in the second flow channel 17.

The carrier gas supply source 21 is connected to the first flow channel 15 through the carrier gas supply channel 27. One end of the carrier gas supply channel 27 is connected to the carrier gas supply source 21. Other end of the carrier gas supply channel 27 is connected to the first flow channel 15 through the three-way valve 24a. Other end of the carrier gas supply channel 27 may be connected directly to the housing 20 included in the desulfurizer 16.

The sulfur-containing gas exhaust channel 26 branches off from the second flow channel 17. The sulfur compound desorbed from the MOF contained in the desulfurization agent 22 is exhausted to the outside of the hydrogen generation device 13 through the sulfur-containing gas exhaust channel 26. In the first variation, the sulfur-containing gas exhaust channel 26 is connected to the second flow channel 17 through the three-way valve 24b. The sulfur-containing gas exhaust channel 26 may be connected directly to the housing 20 included in the desulfurizer 16.

The desulfurization agent 22 contained in the desulfurizer 16 is heated with the heater 30. In the heater 30, a resistor is heated to generate heat. In FIG. 4, the heater 30 is disposed so as to surround the outer circumference of the desulfurizer 16; however, the disposition position of the heater 30 is not limited. For example, the heater 30 may be disposed in the desulfurizer 16.

An inert gas is supplied from the carrier gas supply source 21 to the desulfurizer 16 to exhaust the fuel gas G accumulated in the desulfurizer 16 and the sulfur compound desorbed from the desulfurization agent 22

In the hydrogen generation device 13 according to the first variation, the sulfur compound adsorbed to the desulfurization agent 22 is desorbed to reproduce the desulfurization agent 22. In particular, first, after the supply of the fuel gas G to the desulfurizer 16 is stopped, a controller (not shown) controls the three-way valve 24a so as to supply the inert gas from the carrier gas supply source 21 to the desulfurizer 16. Furthermore, the controller controls the three-way valve 24b so as to guide the gas exhausted from the desulfurizer 16 to the sulfur-containing gas exhaust channel 26. An example of the controller is a computer comprising a central processing unit and a memory.

Next, the controller turns the heater 30 on to heat the desulfurizer 16. As above described, the heating temperature is more than 100 degrees Celsius and not more than 200 degrees Celsius.

The desulfurizer 16 is heated by the heater 30 to desorb the sulfur compound from the desulfurization agent 22. Concurrently with heating the desulfurizer 16, the inert gas is supplied from the carrier gas supply source 21 to the desulfurizer 16 to exhaust the sulfur compound desorbed from the desulfurization agent 22 to the outside of the hydrogen generation device 13 through the sulfur-containing gas exhaust channel 26. In this way, the desulfurization agent 22 is reproduced in the desulfurizer 16 to recover the adsorption performance of the desulfurization agent 22. As a result, the substantial adsorption volume of the desulfurizer 16 is increased.

Hereinafter, the hydrogen generation device 13 according to the second variation will be described with reference to FIG. 5. The hydrogen generation device 13 according to the second variation is the same as the hydrogen generation device 13 according to the first variation shown in FIG. 4, except for the following matters (i) and (ii).

(i) The hydrogen generation device 13 comprises a first open-close valve 25a and a second open-close valve 25b in place of the three-way valve 24b.

(ii) The sulfur-containing gas exhaust channel 26 is connected to the desulfurizer 16 without branching off from the second flow channel 17.

The first open-close valve 25a is disposed in the second flow channel 17. The second open-close valve 25b is disposed in the sulfur-containing gas exhaust channel 26.

In the hydrogen generation device 13 according to the second variation, after the supply of the fuel gas G to the desulfurizer 16 is stopped, a controller (not shown) controls the three-way valve 24a so as to supply the inert gas from the carrier gas supply source 21 to the desulfurizer 16. Furthermore, the controller opens the second open-close valve 25b and closes first open-close valve 25a. In this way, the gas exhausted from the desulfurizer 16 is exhausted to the outside of the hydrogen generation device 13 through the sulfur-containing gas exhaust channel 26.

Then, similarly to the case of the hydrogen generation device 13 according to the first variation, the controller turns the heater 30 on to heat the desulfurizer 16. The desulfurizer 16 is heated by the heater 30 to desorb the sulfur compound from the desulfurization agent 22. Concurrently with heating the desulfurizer 16, the inert gas is supplied from the carrier gas supply source 21 to the desulfurizer 16 to exhaust the sulfur compound desorbed from the desulfurization agent 22 to the outside of the hydrogen generation device 13 through the sulfur-containing gas exhaust channel 26. In this way, the desulfurization agent 22 is reproduced in the desulfurizer 16 to recover the adsorption performance of the desulfurization agent 22. As a result, the substantial adsorption volume of the desulfurizer 16 is increased.

EXAMPLES

Hereinafter, the present invention will be described in more detail with reference to the following examples.

(Synthesis Method)

First, a method for synthesizing isophthalic-acid-HKUST-1 will be described.

Isophthalic-acid-HKUST-1 was synthesized by a conventional solvothermal method as below. As described in the embodiment, isophthalic-acid-HKUST-1 has copper ions and organic ligands. The organic ligands includes 1,3,5-benzenetricarboxylic acid and 1,3-benzenedicarboxylic acid.

Copper nitride trihydrate (product of FUJI FILM Wako Pure Chemical Corporation, 1.65 grams), isophthalic acid (0.4 grams), and BTC (0.5 grams) were mixed with N,N-dimethylformamide (hereinafter, referred to as DMF, product of FUJI FILM Wako Pure Chemical Corporation, 70 milliliters). In this way, a starting material solution was prepared. In the starting material solution, a molar ratio of isophthalic acid to the sum of isophthalic acid and BTC was 0.5.

The starting material solution was poured into a sealed container having an inner periphery coated with Teflon. Then, the starting material solution was stirred at temperature of 80 degrees Celsius for 20 hours to provide a product. The provided product was subjected to centrifugation to provide a precipitation. The provided precipitation was washed three times with DMF and ethanol. Finally, the washed precipitation was dried under reduced pressure. In this way, a sample 1 was provided.

(Structure Evaluation)

Figure 6:
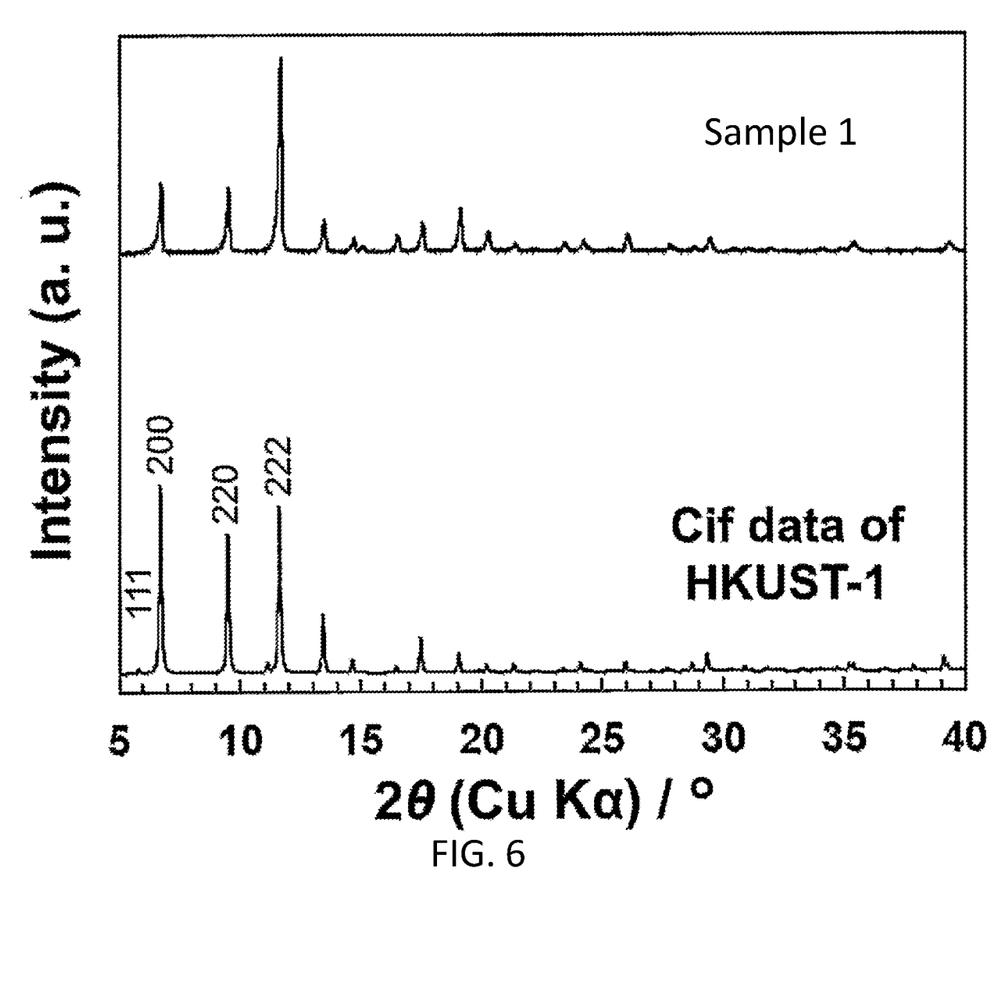
FIG. 6 shows a powder X-ray diffraction pattern of the sample 1 in the example.

The provided sample 1 was subjected to a powder X-ray diffraction analysis to confirm whether or not the provided sample 1 had a three-dimensional crystal structure similar to that of HKUST-1. FIG. 6 shows a powder X-ray diffraction pattern of the sample 1. In FIG. 6, the vertical axis and the horizontal axis represent the diffraction intensity and the diffraction angle 2θ, respectively. The powder X-ray diffraction pattern of the HKUST-1 is derived from the Cambridge Structural Database, deposit number 112954. As is clear from FIG. 6, only peaks derived from HKUST-1 appeared. This reveals that the sample 1 had a three-dimensional crystal structure similar to that of HKUST-1.

(Composition Evaluation)

$^1$H-NMR spectrum of the provided sample 1 was measured with a nuclear magnetic resonator (product of JEOL Ltd., trade name: AL-400) to measure a molar ratio of isophthalic acid included in the provided sample 1 (namely, a molar ratio of the isophthalic acid included in the provided sample 1 to the sum of the BTC and the isophthalic acid included in the provided sample 1).

The NMR measurement condition will be described below.

| | |
|---|---|
| Resonance frequency | 400 MHz |
| Solvent | Deuterated dimethyl sulfoxide and deuterated trifluoroacetic acid (volume ratio: 9:1) |
| Measurement Temperature | 25 degrees Celsius |
| Cumulative number | 128 |

Figure 7:
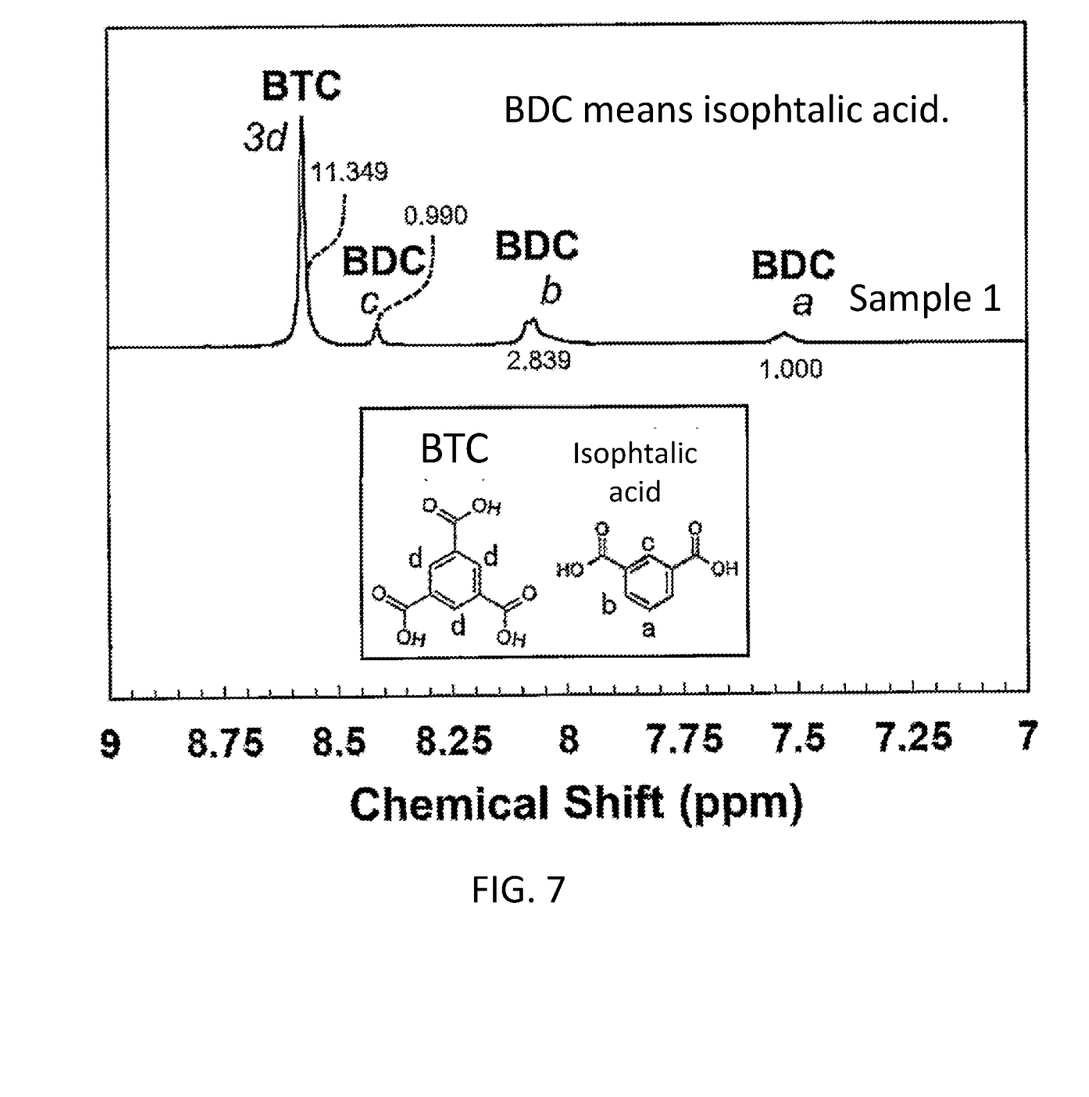
FIG. 7 shows a $^1$H-NMR spectrum of the sample 1 in the example.

FIG. 7 shows a $^1$H-NMR spectrum of the sample 1.

The molar ratio of the isophthalic acid was calculated as below from the values of integral of peaks indicating isophthalic acid and BTC (namely, from the area values of peaks indicating isophthalic acid and BTC). In FIG. 7, the value of the integral of three d-positions of the BTC (namely, the value of the integral of 3d) is 11.349. The value of the integral of an a-position of the isophthalic acid (namely, the value of the integral of a) is 1.000. The value of the integral of two b-positions of the isophthalic acid (namely, the value of the integral of 2b) is 2.839. The value of the integral of a c-position of the isophthalic acid (namely, the value of the integral of c) is 0.990 (which is substantially equal to 1).

The molar ratio of the isophthalic acid in the sample 1 was calculated from these values of the integral of the peaks. In particular, since the value of the integral of three hydrogen atoms which correspond to 3d of the BTC (see FIG. 7) is 11.349, the value of the integral of one hydrogen atom of the d-position included in the BTC is 3.783 (=11.349/3). The value of the integral of one hydrogen atom included in the a-position of the isophthalic acid is 1.000. Therefore, the molar ratio is 0.21 (=1/(3.783+1)). For this reason, the isophthalic-acid-HKUST-1 of the sample 1 is represented by the composition formula $Cu_3(BTC)_{1.58}$(isophthalic acid)$_{0.42}$.

TABLE 2

| | Molar ratio of Isophthalic acid included in Starting Material ((Isophthalic acid)/(Isophthalic acid) + BTC)) | Molar ratio of Isophthalic acid included in provided Sample | Composition Formula |
|---|---|---|---|
| HKUST-1 | — | — | $Cu_3(BTC)_2$ |
| Sample 1 | 0.5 | 0.21 | $Cu_3(BTC)_{1.58}$(isophthalic acid)$_{0.42}$ |

(BET Specific Surface Area Measurement)

Figure 8:
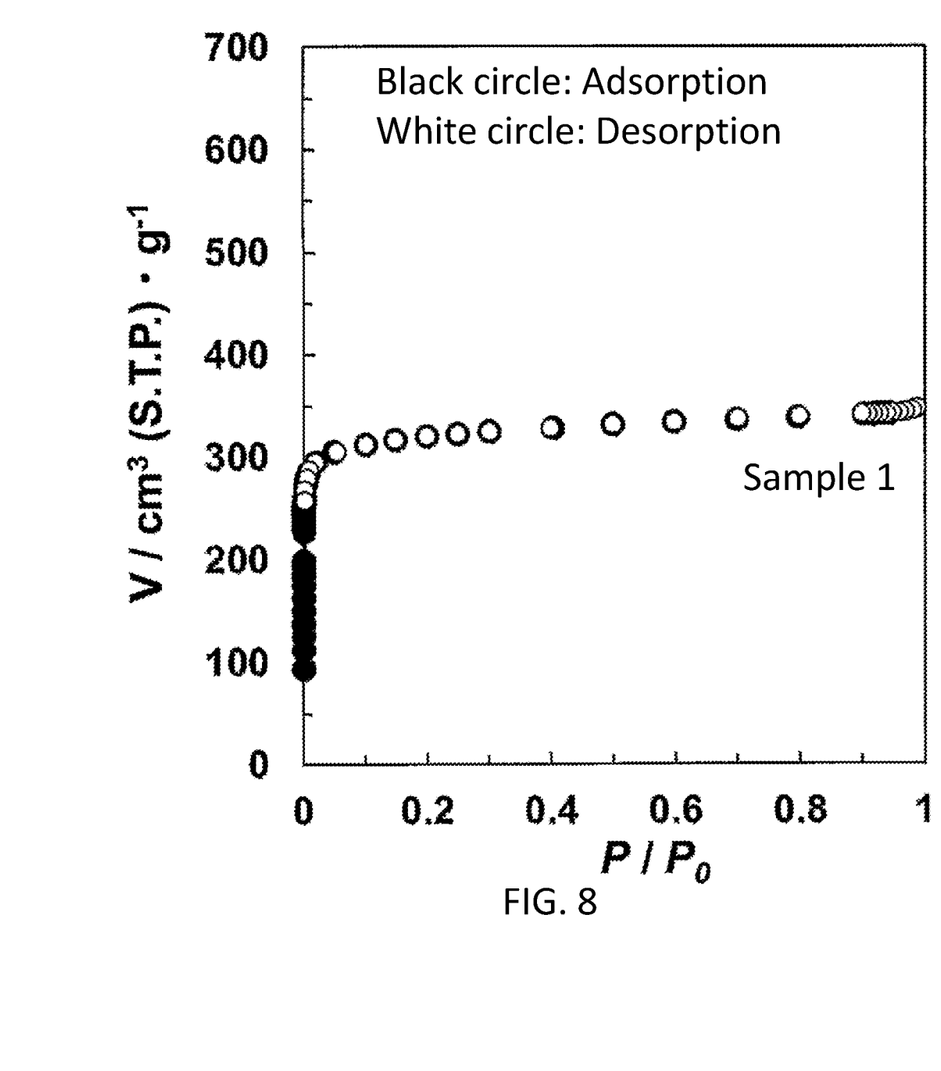
FIG. 8 is a graph showing a measurement result of a nitrogen adsorption isotherm of the sample 1.

Next, the BET specific surface area of the sample 1 was measured. In particular, the sample 1 (approximately 100 milligrams) was heated at temperature of 120 degrees Celsius for 12 hours under vacuum to remove a residual solvent. Subsequently, the nitrogen adsorption isotherm of the sample 1 was measured at temperature of 77 Kelvin with a surface gas sorption analyzer (product of Quantachrome Corporation, trade name: Autosorb-iQ). FIG. 8 is a graph showing a measurement result of the nitrogen adsorption isotherm of the sample 1. In FIG. 8, the vertical axis and the horizontal axis represent an adsorption amount of nitrogen and an introduction pressure of nitrogen (namely, relative pressure), respectively. The relative pressure (p/p0) is a value of ((an adsorption equilibrium pressure)/(a saturated vapor pressure)).

As shown in FIG. 8, the present inventors confirmed that the isotherm of the sample 1 is an isotherm of I-type derived from micropores. The I-type isotherm is defined by International Union of Pure and Applied Chemistry (namely, IUPAC). Next, a BET specific surface area ($m^2$/gram) was calculated within the range of the relative pressure of 0.005-0.04. Within the range, a pore volume (cc/gram) was calculated by a density functional theory method (hereinafter, referred to as "DFT method"). As just described, the present inventor determined that isophthalic acid was incorporated in the skeleton of HKUST-1 in the sample 1 on the basis of the results of the X-ray diffraction pattern shown in FIG. 6, the NMR pattern shown in FIG. 7, and the adsorption isotherm in the BET specific surface area measurement shown in FIG. 8.

In case where isophthalic acid fails to be incorporated in the skeleton of the HKUST-1, the peaks do not accord with each other in the X-ray pattern shown in FIG. 6 and the isotherm shown in FIG. 8 is not I-type.

The following Table 3 shows the BET specific surface area and the pore size of the sample 1.

TABLE 3

| | BET specific surface area ($m^2$/gram) | Pore size (cc/gram) |
|---|---|---|
| Sample 1 | 1,270 | 0.48 |

As shown in Table 3, the BET specific surface area and the pore size of the sample 1 were 1,270 $m^2$/gram and 0.48 milliliters/gram, respectively. It is known that HKUST-1 has a BET specific surface area of approximately 2,000 $m^2$/gram at a maximum. Therefore, the sample 1 has the substantially same BET specific surface area as HKUST-1.

Figure 9:
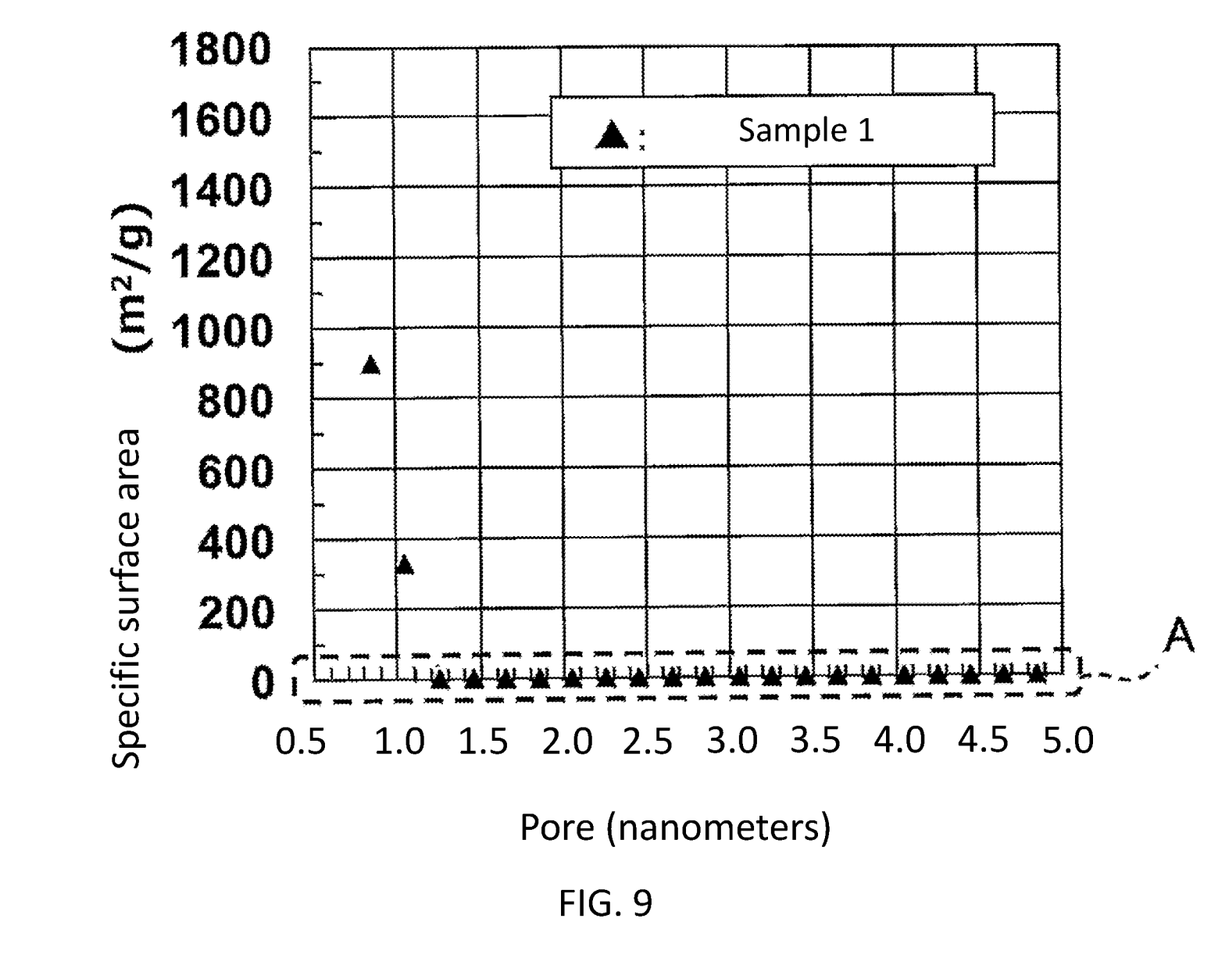
FIG. 9 is a graph showing a relation between a pore size calculated by a DFT method and a BET specific surface area of the sample 1.
Figure 10:
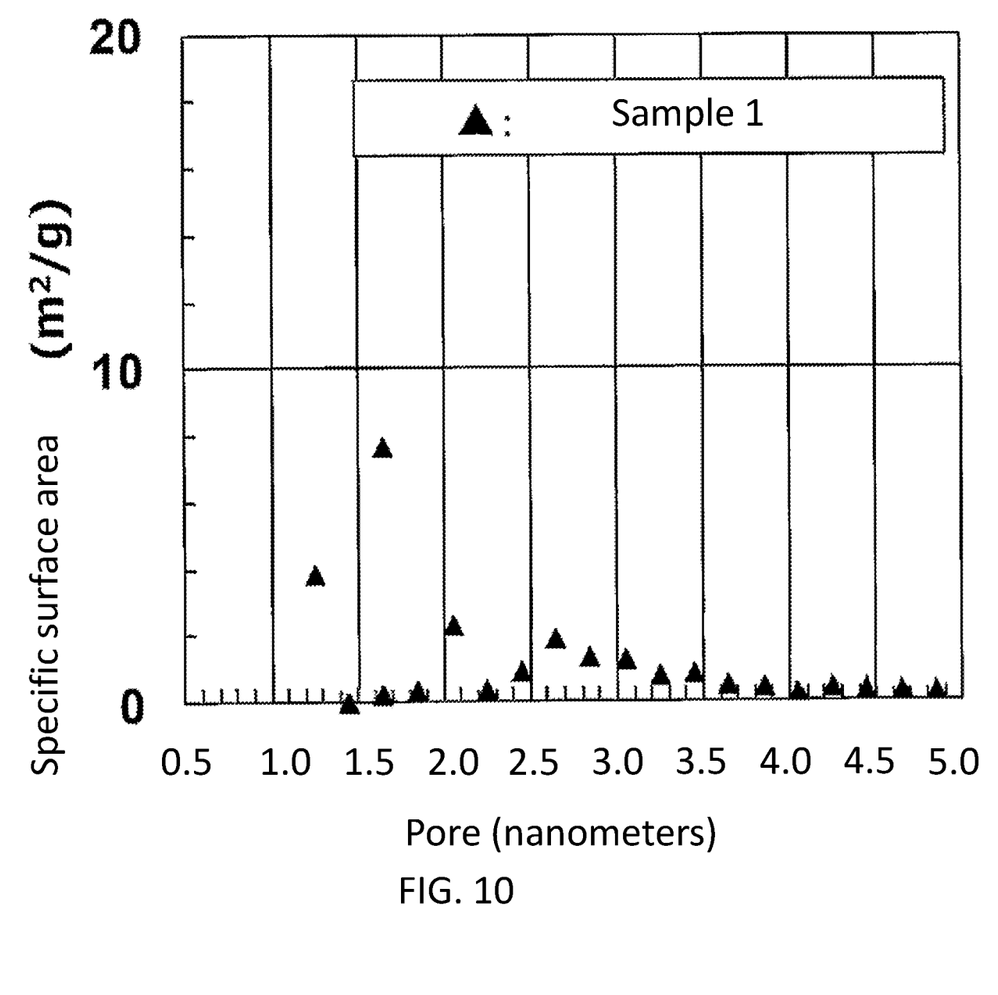
FIG. 10 shows an enlarged drawing of the region A included in FIG. 9.

FIG. 9 is a graph showing a relation between the diameter of the pore size of the sample 1 and the BET specific surface area. FIG. 10 is a graph in which the region A included in FIG. 9 is enlarged. In FIG. 9 and FIG. 10, the vertical axis and the horizontal axis represent the BET specific surface area and the diameter of the pore size, respectively. The pore size was calculated by the DFT method.

It is known that the pore size of HKUST-1 is mainly not more than 1.5 nanometers. For example, HKUST-1 mainly has pores each having a diameter of 0.5 nanometers and pores each having a diameter of 1.5 nanometers. On the basis of the relation between the BET specific surface area and the pore size shown in FIG. 9 and FIG. 10, the present inventor calculated a ratio of the sum of the BET specific surface area of the pores each having a pore size of 0.15 nanometers to the sum of the BET specific surface area of all the pores in the sample 1. As a result, the ratio was 98.2%.

This reveals that the sample 1 mainly has pores each having a pore size of not more than 1.5 nanometers similarly to HKUST-1.

Note that the number of the pores such as mesopores (pore size: 2 nanometers) may be increased and the BET specific surface area may be lowered due to uneven distribution of the isophthalic acid included in the skeleton of HKUST-1. Therefore, it is desirable that the isophthalic acid is distributed uniformly in the skeleton of HKUST-1 in view of increase in the BET specific surface area.

In a chase where a large amount of isophthalic acid is incorporated in the skeleton of HKUST-1, the possibility is increased that a plurality of isophthalic acid molecules are closed to each other in the skeleton of HKUST-1. Therefore, the number of the pores such as mesopores (pore size: 2 nanometers) may be increased. For this reason, it is desirable that the molar ratio of the isophthalic acid is not less than 10% and not more than 25%.

(Desulfurization Test)

The following desulfurization test was conducted to investigate the desulfurization performance of the sample 1. In particular, a reaction tube having an inner diameter of 7 millimeters was filled with the sample 1 (1.1 grams). Then, the reaction tube was loaded into a fixed-bed reactor (i.e., a fixed-bed continuous flow reactor).

Then, a city gas having DMS at a concentration of 100 vol ppm was supplied to the reaction tube at a linear velocity of 100 cm/minute. During the desulfurization test, the temperature of the desulfurization agent (i.e., the sample 1) was maintained at 30 degrees Celsius. The concentration of sulfur contained in the gas exhausted from the reaction tube was measured with a trace sulfur analyzer (product of Mitsubishi Chemical Analytech Co., Ltd.) by an oxidation-decomposition and ultraviolet fluorescence method.

The gas exhausted from the reaction tube was analyzed with a gas chromatograph device comprising a sulfur chemiluminescence detector to identify the sulfur compound. An elapsed time from an analysis starting time point to a time point when the concentration of the sulfur contained in the exhausted gas reached 100 vol ppb was measured as a breakthrough time. The breakthrough time was 195 hours. In addition, the adsorption volume of the sulfur compound was calculated from the total continuous flow sulfur amount until the breakthrough time with regard to the weight of the desulfurization agent with which the reaction tube was filled. In particular, the weight of the sulfur compound adsorbed during the flow of the city gas for 195 hours was measured. As a result, the weight of the sulfur compound was 0.09 grams.

As a result, the adsorption volume of the sample 1 (BET specific surface area: 1,270 m$^2$/gram) was approximately 8 weight percent (=0.09 grams/1.1 grams (i.e., the weight of the sample 1)). This reveals that the sample 1 has a prospective performance as a desulfurization agent.

INDUSTRIAL APPLICABILITY

The desulfurizer according to the present invention can be used for a hydrogen generation device and a fuel cell system.

REFERENTIAL SIGNS LIST

12 Fuel cell
13 Hydrogen generation device
14 Supply source
15 First flow channel
16 Desulfurizer
17 Second flow channel
18 Reformer
19 Third flow channel
20 Housing
20a Inlet
20b Outlet
21 Carrier gas supply source
22 Desulfurization agent
24a Three-way valve
24b Three-way valve
25a First open-close valve
25b Second open-close valve
26 Sulfur-containing gas exhaust channel
27 Carrier gas supply channel
30 Heater
100 Fuel cell system
G Fuel gas (i.e., fluid)

The invention claimed is:

1. A desulfurizer for removing a sulfur compound contained in a fluid, comprising:
   a desulfurization agent for removing the sulfur compound from the fluid; and
   a housing which contains the desulfurization agent and the inside of which the fluid flows through,
   wherein
   the desulfurization agent includes a metal organic framework;
   the metal organic framework has copper ions and organic ligands; and
   the organic ligands include 1,3,5-benzenetricarboxylic acid and 1,3-benzenedicarboxylic acid.

2. The desulfurizer according to claim 1, wherein
   a molar ratio of the 1,3-benzenedicarboxylic acid to a sum of the 1,3,5-benzenetricarboxylic acid and the 1,3-benzenedicarboxylic acid is not less than 10% and not more than 25%.

3. The desulfurizer according to claim 1, wherein
   the metal organic framework has a coordinative-unsaturated open metal site.

4. The desulfurizer according to claim 1, wherein
   temperature of the metal organic framework is maintained at not more than 100 degrees Celsius.

5. The desulfurizer according to claim 1, further comprising:
   a heater for heating the metal organic framework.

6. The desulfurizer according to claim 1, wherein
   pressure is not applied to the fluid in a channel from a supply source of the fluid to the desulfurizer.

7. The desulfurizer according to claim 1, wherein
   the fluid is a fuel gas containing hydrocarbon fuel.

8. A hydrogen generation device, comprising:
   a desulfurizer for removing a sulfur compound contained in a fluid; and
   a reformer for generating hydrogen from the fluid in which the sulfur compound has been removed in the desulfurizer,
   wherein
   the desulfurizer is a desulfurizer according to claim 1.

9. The hydrogen generation device according to claim 8, wherein
   the reformer generates hydrogen from the fluid by a steam reforming reaction.

10. The hydrogen generation device according to claim 8, further comprising:
    a heater for heating the metal organic framework to desorb the sulfur compound from the metal organic framework;

a flow channel connecting the desulfurizer to the reformer in such a manner that the fluid in which the sulfur compound has been removed in the desulfurizer flows to the reformer; and a sulfur-containing gas exhaust channel which connects to the housing or branches off from the flow channel.

11. A fuel cell system, comprising:

a hydrogen generation device; and a fuel cell for generating electric power with hydrogen generated by the hydrogen generation device, wherein the hydrogen generation device is a hydrogen generation device according to claim 8.

* * * * *